United States Patent [19]
Norkus et al.

[11] Patent Number: 6,146,071
[45] Date of Patent: Nov. 14, 2000

[54] CAGED NUT ASSEMBLY

[75] Inventors: James Norkus; William J. Curley, Jr., both of Waterbury, Conn.

[73] Assignee: Illinois Tool Works, Inc., Del.

[21] Appl. No.: 09/291,501

[22] Filed: Apr. 14, 1999

[51] Int. Cl.[7] .................................................. F16B 37/04
[52] U.S. Cl. ........................... 411/104; 411/112; 296/189
[58] Field of Search ................................ 411/84, 85, 103, 411/104, 105, 111, 112, 113; 296/189

[56] References Cited

U.S. PATENT DOCUMENTS

| | | |
|---|---|---|
| 2,825,379 | 3/1958 | Becker . |
| 3,192,981 | 7/1965 | Oliver . |
| 3,599,693 | 8/1971 | Buchell . |
| 4,762,451 | 8/1988 | Collins . |
| 4,875,816 | 10/1989 | Peterson . |
| 4,934,886 | 6/1990 | Aikens . |
| 5,067,863 | 11/1991 | Kowalski . |
| 5,096,350 | 3/1992 | Peterson . |
| 5,193,643 | 3/1993 | McIntyre . |
| 5,281,064 | 1/1994 | Zimmer . |
| 5,409,289 | 4/1995 | Kalian et al. . |
| 5,489,173 | 2/1996 | Hofle . |
| 5,605,353 | 2/1997 | Moss . |
| 5,624,319 | 4/1997 | Golczyk . |
| 5,779,412 | 7/1998 | Nagai . |
| 5,884,963 | 3/1999 | Exposito . |

Primary Examiner—Flemming Saether
Attorney, Agent, or Firm—St Onge Steward Johnston & Reens LLC

[57] ABSTRACT

An improved cage nut assembly for attachment to a frame, which includes a channel therein adapted to receive the caged nut assembly is provided. The caged nut assembly includes a fastener body having a female connector therein and a retainer for encaging the fastener body. The retainer provides a limited range of movement of the fastener body in at least one direction and has cutouts therein sized and adapted to allow access to the female connector within the range of movement of the fastener body. At least one detent extends from a surface of the retainer, which detents are sized and shaped to correspond to at least one notch in the channel of the frame. The detents are biased toward a normal position, but are movable against the bias such that as the caged nut assembly is forced into the channel of the frame, the detents are moved against the bias until the detents are positioned adjacent to the notches in the channel, at which point the detents are biased into the notches, thereby securing the caged nut assembly within the channel. Thus, during a crash situation, the detents may be moved against the bias and the caged nut assembly may be moved within the channel in the frame.

18 Claims, 2 Drawing Sheets

CAGED NUT ASSEMBLY

FIELD OF THE INVENTION

The present invention relates to a caged nut assembly, and more particularly to a caged nut and retainer assembly for mounting a vehicle component, such as an engine cradle, to the frame or rail of a vehicle.

BACKGROUND OF THE INVENTION

Caged fasteners such as caged nuts are frequently used in the manufacture of automobiles and other vehicles. A caged nut provides advantages in that it can be assembled into a product framework during manufacture, so that the number of operations required in the final assembly of the product are reduced. In addition, a caged nut can be attached to the framework in locations which subsequently become enclosed or tightly circumscribed as more parts are assembled onto the product. If a caged nut was not provided in such situations, it would be very difficult to locate a nut by hand to receive a bolt used to fasten components such as an engine cradle onto a vehicle frame.

A caged nut generally comprises a nut encaged in a structure, known as a retainer, that allows access to the nut bore, and provides the nut with a limited range of movement within the retainer. The range of motion of the nut in the cage is provided so that the part being mounted on the frame may be adjusted relative to the frame during final assembly. In the manufacture of automobiles using caged nuts, the retainer was traditionally welded onto the frame of the automobile and provided a nut at a selected location for the attachment of another part, such as an engine cradle, to the frame.

Welding the retainer to the frame suffered from a number of disadvantages, however, one of which being that the welding operation promoted corrosion of the frame. For this reason, other means of attaching the retainer to the frame have been developed.

U.S. Pat. No. 5,624,319 to Golczyk et al. discloses a two-part cage nut 20 having a nut portion 2 and a holding part comprising a slide plate 5 and a clamping arm 6. The clamping arm 6 is formed to extend parallel with the slide plate 5 to provide a generally C-shaped profile, which can be clipped onto a carrier plate 10.

U.S. Pat. No. 4,762,451 to Collins discloses a caged nut 1 which includes lugs 4, through which pass apertures 5. Nut 1 can be secured either to a separate cage which can then be welded to a sheet metal support panel 10 or to the support panel 10 itself, by return bent legs 11 which pass through apertures 5 and are bent to secure nut 1 in place.

U.S. Pat. No. 4,875,816 to Peterson discloses a caged fastener 10 for mounting within a hollow frame member 60. Caged fastener 10 comprises a fastener body 12 and a cage 30 having spring member 52, rigid members 54, secondary spring members 56 and lateral struts 57. Spring member 52, rigid members 54, secondary spring members 56 and lateral struts 57 are all sized and shaped to fit within a nut chamber 66 in frame member 60, and to frictionally hold caged fastener 10 therein.

U.S. Pat. No. 5,193,643 to McIntyre discloses a nut and retainer assembly 42, 44 which comprises a nut 50 and a retainer 52, 108. Retainer 52, 108 includes spring biased tabs 70, 110 and a handle portions 72, 112 for locking nut and retainer assembly 42, 44 within a housing 16 or hollow frame 14.

A disadvantage of all of the prior art patents discussed above is that none of them make any provision for the effects of a collision. It is well known in the automotive industry that in a crash, particularly in a head-on crash, it is desirable to provide "crumple zones" which allow the vehicle frame to crumple accordion-style, thereby absorbing some of the forces caused by the crash so as to protect the vehicle passengers. However, when the vehicle engine cradle is rigidly mounted to the frame, this crumpling may cause the engine to be forced rearward into the passenger compartment, which is of course undesirable as severe injuries to the passengers may result. Although the prior art patents discussed above allow for some limited planar movement of the nut relative to the retainer so that a bolt may be inserted into the nut more easily, the planar movement is limited to a small fraction of an inch, which does very little or nothing to inhibit the engine from being forced rearward.

What is desired therefore is a caged nut assembly which can be mounted to a frame member without welding, which does not promote corrosion on a frame when mounted thereon, which allows for planar movement of the nut relative to the retainer so that a bolt may be inserted into the nut more easily, and which allows for movement of the entire caged nut assembly relative to the frame during a collision to inhibit the engine cradle from being forced into the passenger compartment while the frame crumples.

SUMMARY OF THE INVENTION

Accordingly, it is an object of the present invention to provide a caged nut assembly which can be mounted to a frame member without welding.

Another object of the present invention is to provide a caged nut assembly which does not promote corrosion on a frame when mounted thereon.

A further object of the present invention is to provide a caged nut assembly which allows for planar movement of the nut relative to the retainer so that a bolt may be inserted into the nut more easily.

Still another object of the present invention is to provide a caged nut assembly which allows for movement of the entire caged nut assembly relative to the frame during a collision to inhibit the engine cradle from being forced into the passenger compartment while the frame crumples.

These and other objects of the present invention are achieved by provision of a caged nut assembly for attachment to a frame, which includes a channel therein adapted to receive the caged nut assembly. The caged nut assembly includes a fastener body having a female connector therein and a retainer for encaging the fastener body. The retainer provides a limited range of movement of the fastener body in at least one direction and has cutouts therein sized and adapted to allow access to the female connector within the range of movement of the fastener body.

At least one detent extends from a surface of the retainer, which detents are sized and shaped to correspond to a at least one notch in the channel of the frame. The detents are biased toward a normal position, but are movable against the bias such that as the caged nut assembly is forced into the channel of the frame, the detents are moved against the bias until the detents are positioned adjacent to the notches in the channel, at which point the detents are biased into the notches, thereby securing the caged nut assembly within the channel. Thus, during a collision, the detents may be moved against the bias and the caged nut assembly may be moved within the channel in the frame.

The invention and its particular features and advantages will become more apparent from the following detailed description considered with reference to the accompanying drawings.

DETAILED DESCRIPTION OF THE INVENTION

Figure 1:
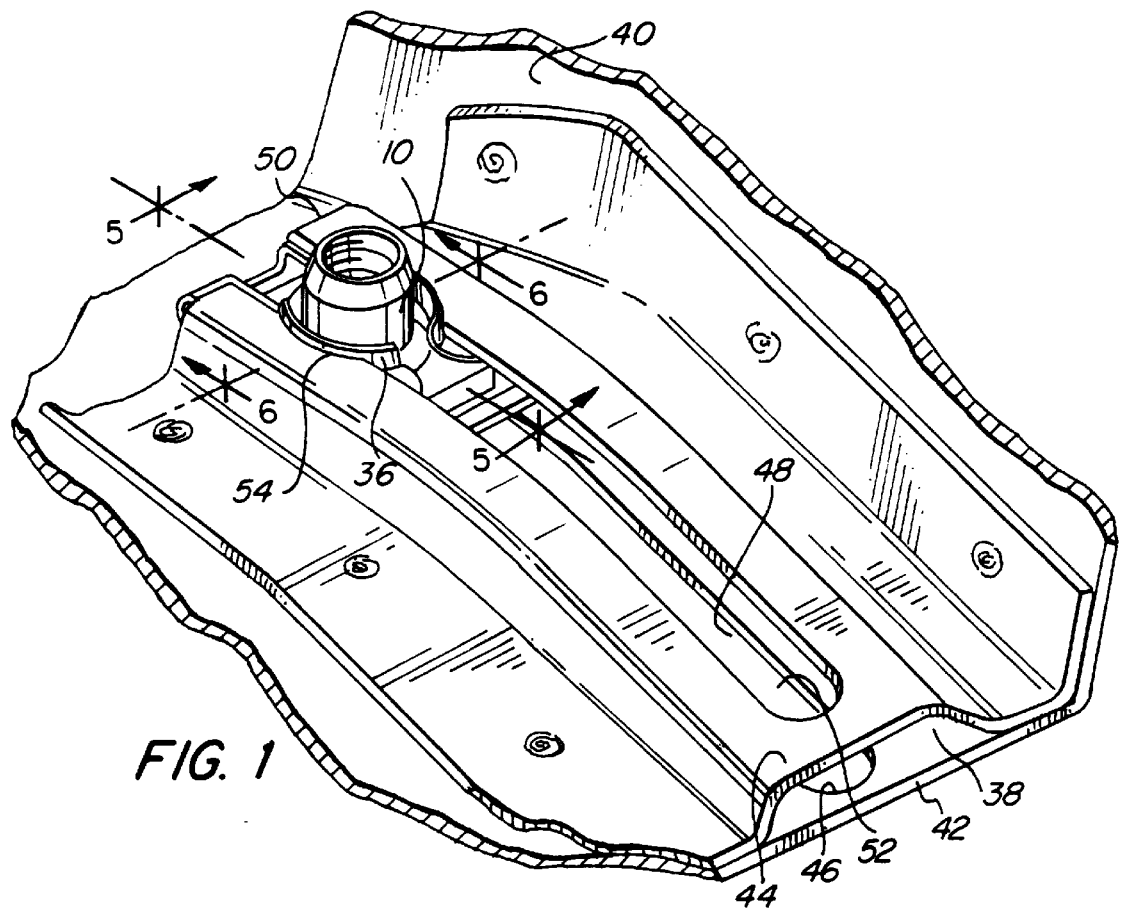
FIG. 1 is a perspective view of a caged nut assembly in accordance with the present invention shown disposed within a vehicle frame member.
Figures 2, 3, 4:
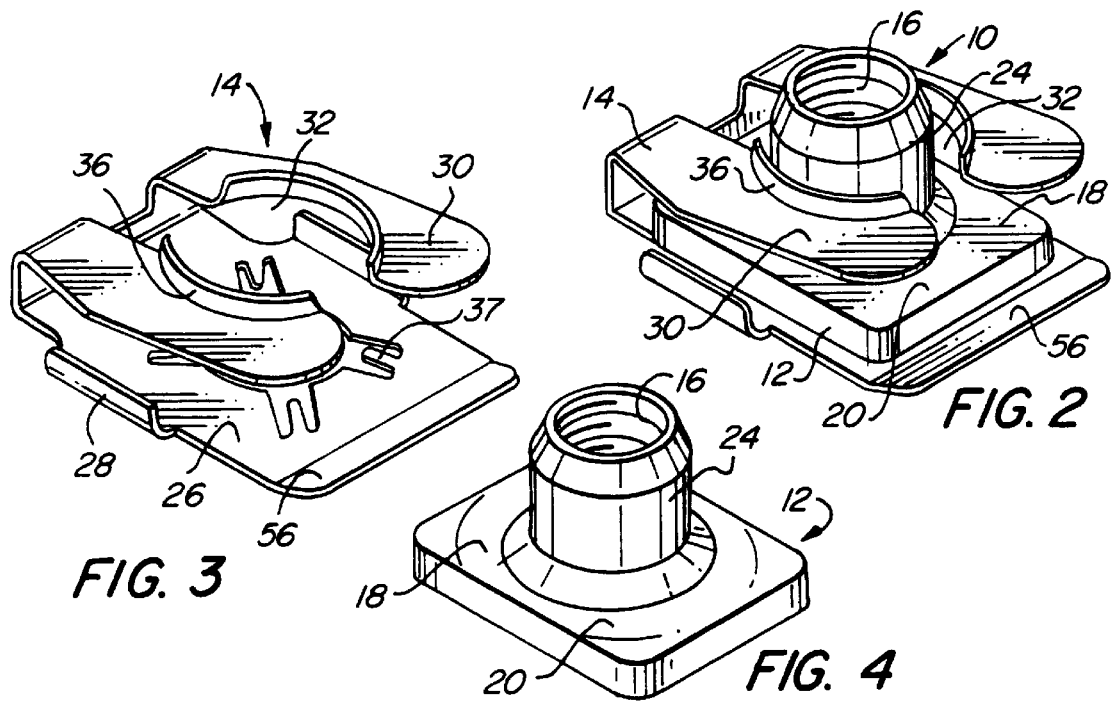
FIG. 2 is a perspective view of the caged nut assembly of FIG. 1.
FIG. 3 is a perspective view of the retainer portion of the caged nut assembly of FIG. 1.
FIG. 4 is a perspective view of the nut portion of the caged nut assembly of FIG. 1.
Figure 5:
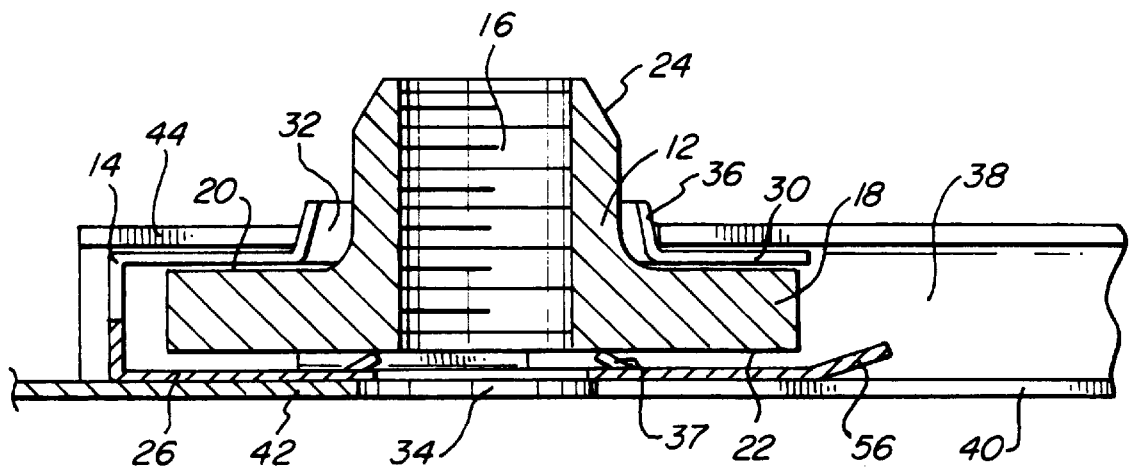
FIG. 5 is a partially cross-sectional view of the caged nut assembly and vehicle frame member taken along line 5—5 of FIG. 1.
Figure 6:
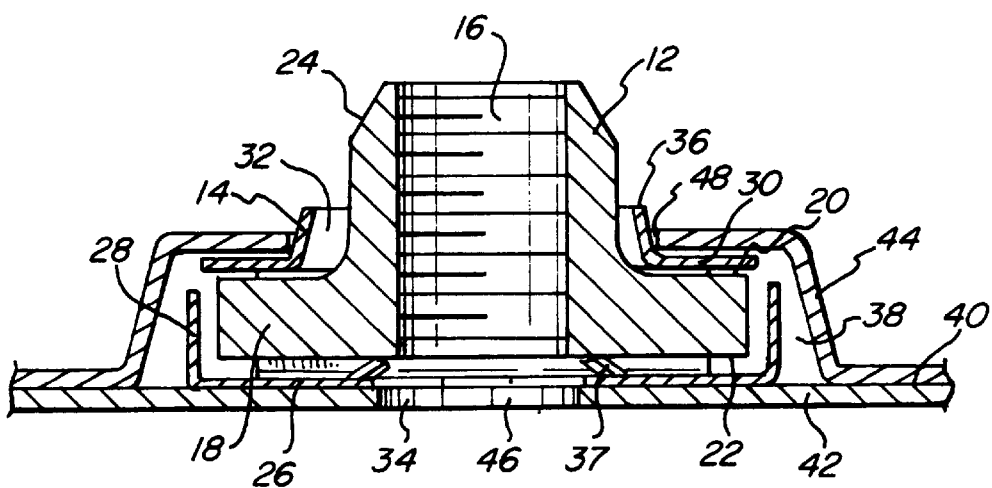
FIG. 6 is a partially cross-sectional view of the caged nut assembly and vehicle frame member taken along line 6—6 of FIG. 1.

Referring first to FIGS. 1 through 4 a caged nut assembly in accordance with the present invention is shown, generally indicated at 10. Caged nut assembly 10 generally comprises a fastener body 12 disposed within a retainer 14. Fastener body 12 includes a connecting means, which may comprise a female fastening means such as a connecting bore adapted to receive a male fastener, such as a rivet, male threaded fastener, or a male snap-in connector, or it may comprise a male fastening means such as a threaded stud or bolt, or a snap mount connector. Preferably, however, the connecting means comprises a bore 16 which is internally threaded to receive a male threaded fastener. Most preferably, bore 16 is coated with Teflon™ coating to inhibit fouling of the threads by any rustproofing or other coatings sprayed on caged nut assembly 10. Fastener body 12 preferably comprises a generally planar base 18 having generally planar upper 20 and lower 22 surfaces. A generally cylindrical stem 24 extends out from upper surface 20 of base 18, and threaded bore 16 preferably extends through stem 24. Fastener body 12 may have any of numerous shapes, and the particular shape shown in the figures is for illustration only.

Fastener body 12 is encaged within retainer 14, which includes a generally planar base 26 having two leaf elements 28 extending upwardly from two opposite side edges of base 26. Leaf elements 28 are provided to restrict side-to-side planar movement of fastener body 12 within retainer 14. However, it should be noted that movement is not completely restricted, and base 26 is sized and leaf elements 28 are spaced apart so as to allow for limited side-to-side planar movement of fastener body 12 within retainer 14.

Extending upwardly from a rear edge of base 26 are a pair of legs 30. Legs 30 extend upwardly from base 26 of retainer 14 past base 16 of fastener body 12 and extend forwardly to overlie at least a portion of fastener body 12 to restrict vertical movement of fastener body 12 within retainer 14. Legs 30 have cutouts 32 therein sized and located to permit stem 24 to pass therethrough within the range of planar movement of fastener body 12 within retainer 14. Similarly, base 26 of retainer 14 includes an cutout 34 sized and located to permit access, through base 26, to bore 14 of fastener body 12 within the range of planar movement of fastener body 12 within retainer 14.

A pair of detents 36 extends upwardly from the portion of legs 30 overlying fastener body 12. Preferably, detents 36 take the form of upwardly extending lips surrounding the periphery of cutouts 32 in legs 30. Legs 30 are spaced apart and formed from a sheet steel or other semi-rigid elastically deformable material so that legs 30 and therefore detents 32 are biased to a normal position, but are movable toward each other against the bias when a force is applied. Most preferably, cutouts 32 in legs 30 is circular or elliptical, and therefore detents 32 will have a shape corresponding to the arc of a circle or ellipse.

Extending from base 26 of retainer 14 toward fastener body 12 are a plurality of projections 37. Preferably, projections 37 comprise cut or stamped portions of base 26 which are bent upward. Projections 37 act to minimize a planar contact surface between base 26 of retainer 14 and lower surface 22 of base 16 of fastener body 12 so that any potential welding therebetween by any rustproofing or other coating means sprayed on caged nut assembly 10 is minimized.

Caged nut assembly 10 is adapted to be received by a channel 38 in a vehicle frame 40. Channel 38 is defined by an outer wall 42 of frame 40 and an inner wall 44, which is attached to outer wall 42 by spot welding, riveting, or any other suitable means. Outer wall 42 has a slot 46 therein extending for substantially the length of channel 38 so that a male fastener engaging bore 16 can slide therein as caged nut assembly 10 slides within channel 38. Inner wall 44 has a slot 48 therein extending for substantially the length of channel 38 so that stem 24 and detents 36 can slide therein as caged nut assembly 10 slides within channel 38. Slot 48 in inner wall 44 is sized so as to be narrower than the extent of detents 36 when legs 30 and detents 36 are biased to the normal position, but such that detents 36 may fit within slot 44 when legs 30 and detents 36 are moved toward each other against the bias. Slot 48 in inner wall 44 has an open insert end 50 allowing caged nut assembly 10 to be inserted into channel 38, and a closed termination end 52, past which caged nut assembly 10 cannot slide.

Inner wall 44 includes a pair of notches 54 located along slot 48 proximate to open insert end 50 thereof. Notches 54 have a size and shape complimentary to detents 36. Preferably, there are two detents 36, one located on each of legs 30, so there are preferably two notches 54, one located on each side of slot 48, although other numbers of detents and notches are possible. The width of slot 48 is preferably tapered from a larger width at open insert end 50 to a narrower width at a point adjacent to notches 54.

Notches 54 and detents 36 cooperate in the following manner. Caged nut assembly 10 is positioned adjacent to channel 38 at open insert end 50. Detents 36, which are biased to the normal position, are adjacent to open insert end 50 of slot 48 of inner wall 44. A force is applied to begin moving caged nut assembly 10 along channel 38. Detents 36, and therefore legs 30, are moved toward each other against the bias as caged nut assembly 10 is moved down channel 38. This moving of detents 36 against the bias is facilitated by the circular or elliptical shape of detents 36 as detents 36 are forced against the opening of slot 48, and by the tapering of slot 48. When caged nut assembly 10 reaches a position where detents 36 are adjacent notches 54, however, detents 36, being sized and shaped to be complimentary to notches 54, are biased by legs 30 back away from each other toward the normal position and into notches 54, thereby securing retainer 14 of caged nut assembly 10 in position within channel 38.

To disengage detents 36 from notches 54, a force on caged nut assembly 10 along channel 38 sufficient to move detents 36 and legs 30 against the bias is required. Such a force may be applied intentionally if it is desired to remove caged nut assembly 10 from channel 38 or to move caged nut assembly 10 further down channel 38 toward closed termination end 52. Such a force may also be applied by the engine cradle or frame during a collision. When a collision occurs, it is often desirable for the frame and engine cradle to be capable of movement relative to each other. During a head-on collision, for example, it is often desirable for the frame to crumple rearward to absorb some of the forces caused by the crash so that the full force is not felt by the passengers. However, it is undesirable for the engine to be forced rearward into the passenger compartment, as serious injury may result. When the present invention is used to mount the engine cradle to the frame, the frame may still crumple rearward. However, the forces on the frame, typically being sufficient to disengage detents 36 from notches 54, cause caged nut assembly 10 to move down channel 38 toward closed termination end 52 thereof. Therefore, although the frame crumples rearward, the engine cradle, not being rigidly mounted thereto, will not be forced rearward therewith.

Preferably, slot 46 in outer wall 42 includes an enlarged portion or aperture adjacent to the position of bore 16 when caged nut assembly 10 is secured in place by detents 36 in notches 54 to permit access, through outer wall 42, to bore 16 of fastener body 12 within the range of planar movement of fastener body 12 within retainer 14. Also preferably, the width of slot 48 in inner wall 44 is tapered from a larger width at a point adjacent to notches 54 to a narrower width at least part way down channel 38 toward termination end 52 thereof such that an increasing force is required to slide caged nut assembly 10 the further down channel 38 caged nut assembly 10 is slid, since a greater and greater force will be required to move detents 36 against the bias. In addition, base 26 of retainer 14 preferably includes an angled end portion 56 to facilitate the insertion of caged nut assembly 10 into channel 38.

The present invention, therefore, provides a caged nut assembly which can be mounted to a frame member without welding, which does not promote corrosion on a frame when mounted thereon, which allows for planar movement of the nut relative to the retainer so that a bolt may be inserted into the nut more easily, and which allows for movement of the entire caged nut assembly relative to the frame during a crash to inhibit the engine cradle from being forced into the passenger compartment while the frame crumples.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A caged nut assembly comprising:
   a fastener body having a female connector therein;
   a retainer for encaging said fastener body, said retainer providing a limited range of movement of said fastener body in at least one direction, and having cutouts sized and adapted to allow access to the female connector within the range of movement of said fastener body;
   a frame having a channel therein adapted to receive said retainer, said channel having at least one notch therealong;
   at least one detent extending from a surface of said retainer, said at least one detent sized and shaped to correspond to the at least one notch in the channel of the frame, said at least one detent being biased toward a normal position, but being movable against the bias such that as said caged nut assembly is forced into the channel of the frame, said at least one detent is moved against the bias until said at least one detent is positioned adjacent to the at least one notch in the channel, at which point said at least one detent is biased into the at least one notch, thereby securing said retainer in position within the channel; and
   said at least one detent being movable against said bias and said retainer being movable within the channel in the frame when a sufficient force is applied to said fastener body.

2. The caged nut assembly of claim 1 wherein said at least one detent and the at least one notch in the channel of the frame have a shape corresponding to an arc of a circle.

3. The caged nut assembly of claim 2 wherein said at least one detent is located along a periphery of one of the cutouts of said retainer.

4. The caged nut assembly of claim 1 wherein said at least one detent and the at least one notch in the channel of the frame have a shape corresponding to an arc of an ellipse.

5. The caged nut assembly of claim 4 wherein said at least one detent is located along a periphery of one of the cutouts of said retainer.

6. The caged nut assembly of claim 1 wherein the female connector of said fastener body comprises a female threaded bore.

7. The caged nut assembly of claim 1 further comprising a plurality of projections extending from said retainer toward said fastener body minimizing a planar contact surface between said fastener body and said retainer, thereby minimizing welding of said fastener body to said retainer by coating means applied thereto.

8. A caged nut assembly comprising:
   a fastener body comprised of a generally planar base having generally planar upper and lower surfaces, a stem extending from the upper surface of the base, and a threaded bore extending through the base and into the stem;
   a retainer for generally confining said fastener body while permitting a limited range of movement of said fastener body in at least one planar direction, said retainer comprising a generally planar base having a cutout therein sized and located to permit access, through the base of said retainer, to the bore of said fastener body within the range of planar movement of said fastener body within said retainer, said retainer further comprising a pair of legs extending from the base, at least a portion of the legs being bent to overlie at least a portion of the upper surface of said fastener body such that vertical movement is generally restricted, the legs having cutouts therein sized and located to permit the stem of said fastener body to pass therethrough within the range of planar movement of said fastener body within said retainer;
   a frame having a channel therein adapted to receive said retainer, said channel having at least one pair of opposing notches therealong;
   a detent extending from each of the legs of said retainer, said detents being located along a periphery of the cutouts in the legs and being sized and shaped to correspond to the at least one pair of opposing notches in the channel of the frame, the legs of said fastener having a space therebetween and being biased toward a normal position, but being movable against the bias toward each other such that as said retainer is forced into the channel of the frame, the legs are moved against the bias toward each other until said detents are positioned adjacent to the notches in the channel, at which point the legs are biased away from each other and said detents are biased into the at least one pair of notches, thereby securing said retainer in position within the channel; and said legs and said detents being movable against said bias and said retainer being movable within the channel in the frame when a sufficient force is applied to said fastener body.

9. The caged nut assembly of claim 8 wherein said detents and the notches in the channel of the frame have a shape corresponding to an arc of a circle.

10. The caged nut assembly of claim 8 wherein said detents and the notches in the channel of the frame have a shape corresponding to an arc of an ellipse.

11. The caged nut assembly of claim 8 further comprising a plurality of projections extending from the base of said retainer toward said fastener body such that a planar contact surface between the lower surface of the base of said fastener body and the base of said retainer is minimized.

12. A female fastener assembly comprising:

a frame having an outer wall and an inner wall defining a channel therebetween, the outer wall and the inner wall having slots passing therethrough for substantially the length of the channel, the slots having an open insert end and a closed termination end, the slot of the inner wall having, proximate to the insert end, a notch on each side of the slot; and a caged nut assembly comprising:

a fastener body having a female connector therein;

a retainer for encaging said fastener body, said retainer providing a limited range of movement of said fastener body in at least one direction, and having cutouts sized and adapted to allow access to the female connector within the range of movement of said fastener body;

a pair of detents extending from a surface of said retainer, said detents sized and shaped to correspond to the notches in the channel of the frame, said detents being biased toward a normal position, but being movable against the bias such that as said caged nut assembly is forced into the channel of the frame, said detents are moved against the bias until said detents are positioned adjacent to the notches in the channel, at which point said detents are biased into the notches, thereby securing said caged nut assembly in position within the channel; and said detents being movable against said bias and said retainer being movable within the channel toward the termination end thereof when a sufficient force is applied to said fastener body.

13. The female fastener assembly of claim 12 wherein said detents and the notches in the channel of the frame have a shape conforming to an arc of a circle.

14. The female fastener assembly of claim 13 wherein said detents are located along a periphery of one of the cutouts of said retainer.

15. The female fastener assembly of claim 12 wherein said detents and the notches in the channel of the frame have a shape conforming to an arc of an ellipse.

16. The female fastener assembly of claim 15 wherein said detents are located along a periphery of one of the cutouts of said retainer.

17. The female fastener assembly of claim 12 wherein the female connector of said fastener body comprises a female threaded bore.

18. The female fastener assembly of claim 12 further comprising a plurality of projections extending from said retainer toward said fastener body minimizing a planar contact surface between said fastener body and said retainer, thereby minimizing welding of said fastener body to said retainer by coating means applied thereto.

* * * * *